United States Patent [19]

James

[11] Patent Number: 5,678,796
[45] Date of Patent: Oct. 21, 1997

[54] ATTACHMENT MECHANISM

[76] Inventor: Michael L. James, 12197 Sanibel Ct., Reston, Va. 22091

[21] Appl. No.: 693,401

[22] Filed: Aug. 7, 1996

Related U.S. Application Data

[62] Division of Ser. No. 404,491, Mar. 17, 1995, Pat. No. 5,575,300.

[51] Int. Cl.$^6$ .................................................. E04H 15/06
[52] U.S. Cl. ........................ 248/226.11; 248/229.12; 248/231.31; 248/505; 224/42.26; 224/558; 135/88.01; 135/88.06
[58] Field of Search .................. 248/229.12, 229.14, 248/229.21, 229.22, 229.24, 231.31, 231.41, 505; 224/42.26, 42.27, 42.28, 42.13, 558; 135/88.01, 88.06

[56] References Cited

U.S. PATENT DOCUMENTS

| | | | |
|---|---|---|---|
| 1,095,856 | 5/1914 | Harnishfeger | 224/42.28 |
| 1,141,185 | 6/1915 | Harnishfeger | 224/42.28 |
| 1,337,911 | 4/1920 | Hoover | 224/42.28 |
| 1,585,436 | 5/1926 | Swenson | 224/42.12 |
| 1,593,441 | 7/1926 | Cosgrove | 224/42.12 X |
| 3,036,583 | 5/1962 | Miller | 135/4 |
| 3,465,765 | 9/1969 | Dietz | 135/88.06 X |
| 4,605,030 | 8/1986 | Johnson | 135/117 |
| 4,655,236 | 4/1987 | Dorame et al. | 135/88 |
| 4,683,900 | 8/1987 | Carmichael | 135/88.06 |
| 4,886,083 | 12/1989 | Gamache | 135/88 |
| 4,944,321 | 7/1990 | Moyet-Ortiz | 135/88 |
| 5,241,977 | 9/1993 | Flores et al. | 135/88 |

*Primary Examiner*—Alvin C. Chin-Shue
*Assistant Examiner*—Long Dinh Phan
*Attorney, Agent, or Firm*—Rabin, Champagne, & Lynt, P.C.

[57] ABSTRACT

An attachment mechanism for grasping an object such as an automobile tire. The attachment mechanism includes a number of clamp members pivotally connected to an inner plate. The clamp members fit around and grasp the object, and are adjustable to fit around objects of different sizes. The attachment member may be used, for example, as a locking mechanism for an automobile attachment such as a portable cover. The attachment mechanism locks onto the tires without any support from the ground. The frame for the automobile attachment can then be coupled to the attachment mechanisms, which provide the necessary support for the cover.

10 Claims, 6 Drawing Sheets

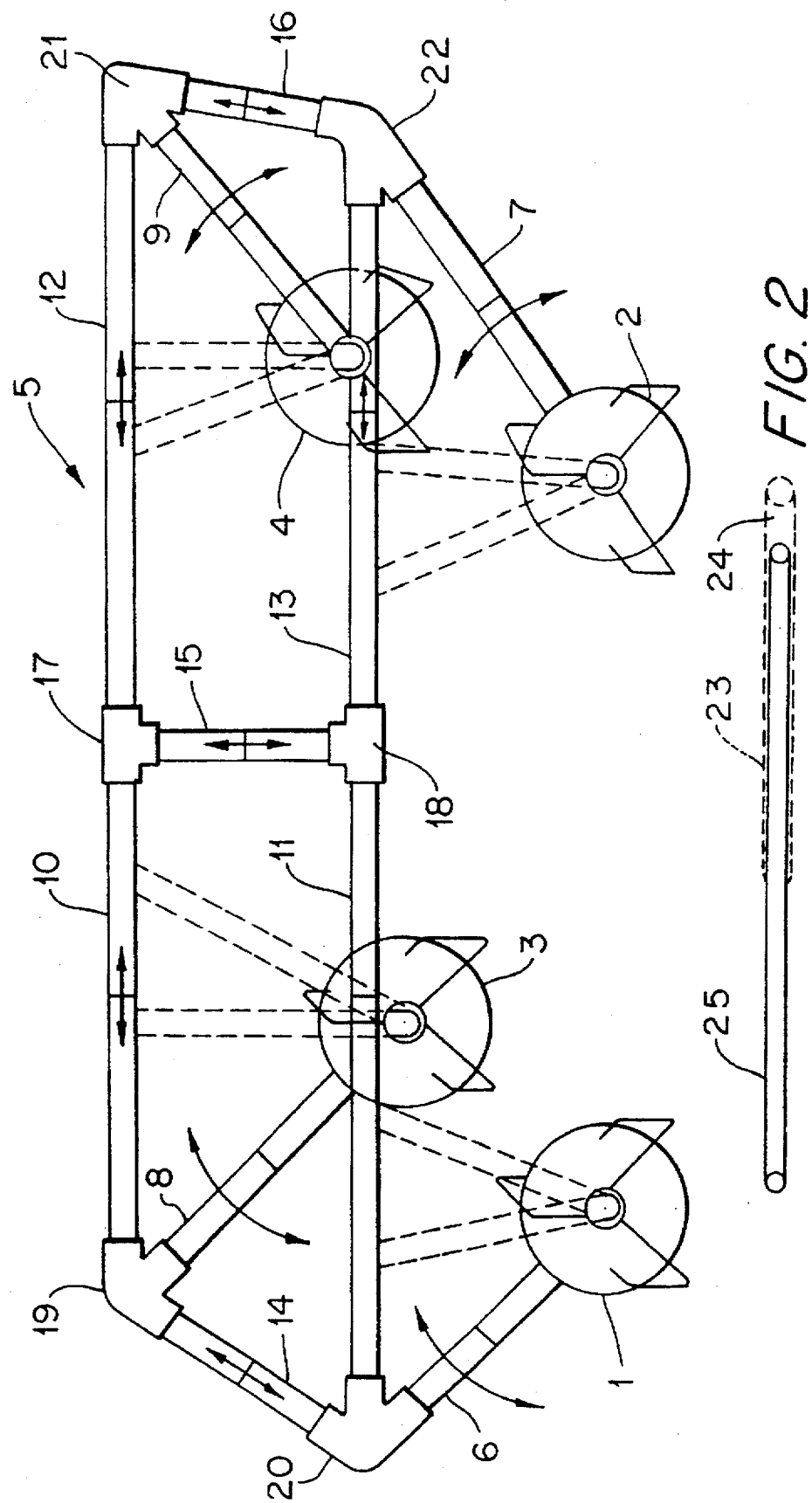

ATTACHMENT MECHANISM

This is a Division of Application Ser. No. 08/404,491, filed Mar. 17, 1995 now U.S. Pat. No. 5,575,300.

FIELD OF THE INVENTION

The present invention relates generally to means for protecting an automobile from the elements. In particular, the present invention relates to automobile covers that are portable and easily assembled and to an attachment mechanism used to couple the frame of the automobile cover to the wheels of the car.

BACKGROUND OF THE INVENTION

One of the considerations of owning an automobile is protecting it from the elements. Many people have garages or carports, but in some urban areas, this is not practical. In most cities, street parking or alley parking is most common. Beaches often provide parking in large, open, sandy lots that offer no protection for cars from the damaging rays of the sun. Further, even if the owner of the automobile has a garage at home, he is not guaranteed a cover for his car when he reaches his destination. For owners of expensive or classic cars, whether protection will be provided is a major factor in deciding whether the automobile will be driven to a particular destination.

Portable car covers have been designed for protecting automobiles from the elements. Most automobile covers are simply tarps that are used to cover the car, and are attached to the car in some manner, such as by tying the tarp to the bumper. These tarp style covers are not adequate to truly protect the car. They themselves contact the car, and may sometimes cause damage to the finish due to abrasion. Further, if left in contact with the automobile for too long, moisture can develop between the tarp and the car body, where it is trapped and can cause rust.

Other automobile covers have been designed which do not contact the body of the car. For example, U.S. Pat. No. 5,241,977 to Flores et al. discloses a portable frame with an attached tarp-like cover. The frame consists of telescoping tubes that provide a shape for the cover. The frame is supported by parking the automobile on four base portions that are attached to the bottom of the frame. While this device provides some protection for an automobile, it is difficult to assemble. Because the automobile must be driven onto the base portions, these must be in place before the car is parked. This makes the device impractical in city parking situations, where a car must usually be parallel-parked in a small space. This car cover is also impractical for use with an automobile that is parked on a hill.

U.S. Pat. No. 4,605,030 to Johnson discloses a similar automobile cover. This cover is an improvement in that it includes cross-members on the frame, making the cover more stable, particularly in windy weather. Like the Flores device, however, the automobile must be driven onto four base portions in order to anchor the frame. Similarly, U.S. Pat. No. 4,655,236 discloses a similar frame that includes a removable spacer resting on the roof of the automobile that provides an incline for causing rain to run off the sides of the cover. U.S. Pat. No. 4,944,321 to Moyet-Ortiz discloses a similar cover, albeit one with a more complex frame that more completely covers the automobile. Both of these devices require that the automobile be driven onto base units to anchor the frame.

U.S. Pat. No. 3,036,583 to Miller discloses another automobile cover. While this device only requires two base portions to support the frame, it is still required that the automobile be driven onto the base portions to anchor the device. U.S. Pat. No. 4,886,083 also discloses an automobile cover that entirely encloses the parked car. However, the automobile must be driven onto an entire platform in order to anchor the frame. This renders the device less than portable.

While the references devices all provide automobiles with differing degrees of protection from the elements, the designs are somewhat impractical. Some do not provide enough protection, only shading the automobile from directly above. The devices that provide more protection are more complicated, making them more difficult to assemble and store. All of the devices require at least some base to be put in place before the automobile is parked, making them impractical, especially for city use, or when covering the automobile is an afterthought. What is needed is a simple, portable automobile cover that provides protection for the car, is easy to assemble and store, and which can be completely assembled and put into place after the car has already been parked.

SUMMARY OF THE INVENTION

It is therefore an object of the present invention to provide an automobile cover that can be disassembled and easily stored in a car trunk.

It is also an object of the present invention to provide an automobile cover that does not come into contact with the body of the automobile.

It is a further object of the present invention to provide an automobile cover that is easy to assemble.

It is another object of the present invention to provide an automobile cover that can be assembled in its entirety after the car has already been parked.

It is an additional object of the present invention to provide an automobile cover that adequately protects the parked car from the elements.

It is still another object of the present invention to provide an automobile cover that can be used with an automobile that is parked on a hill.

These and other objects and advantages of the present invention will be apparent to those of ordinary skill in the art upon inspection of the detailed description, drawings, and appended claims.

The present invention is a portable automobile cover that can be assembled in its entirety and attached to the automobile after the automobile has been parked. No bases anchored under the parked car are needed because the frame of the cover attaches directly to the outsides of the wheels of the automobile, rather than beneath the tires. Once the attachment mechanisms are connected to the wheels, the remainder of the frame can be assembled, and a flexible cover is attached to the frame. The frame is adjustable to fit to any size wheel and any size car or truck. Because a vehicle does not have to be driven onto a number of bases, any difficult to park vehicle such as a boat on a trailer or a mobile home can be provided with cover by a variation of the present invention.

The present invention may also be used when the vehicle is parked on a hill, as it does not rely on anchored bases and can be adjusted to tilt in order to adapt to the grade and keep the cover level.

BRIEF DESCRIPTION OF THE DRAWINGS

FIG. 1 shows an example of a frame to be used as part of the present invention.

FIG. 2 shows a detail of an adjustable locking pole.

DETAILED DESCRIPTION OF THE PRESENT INVENTION

Figure 3:
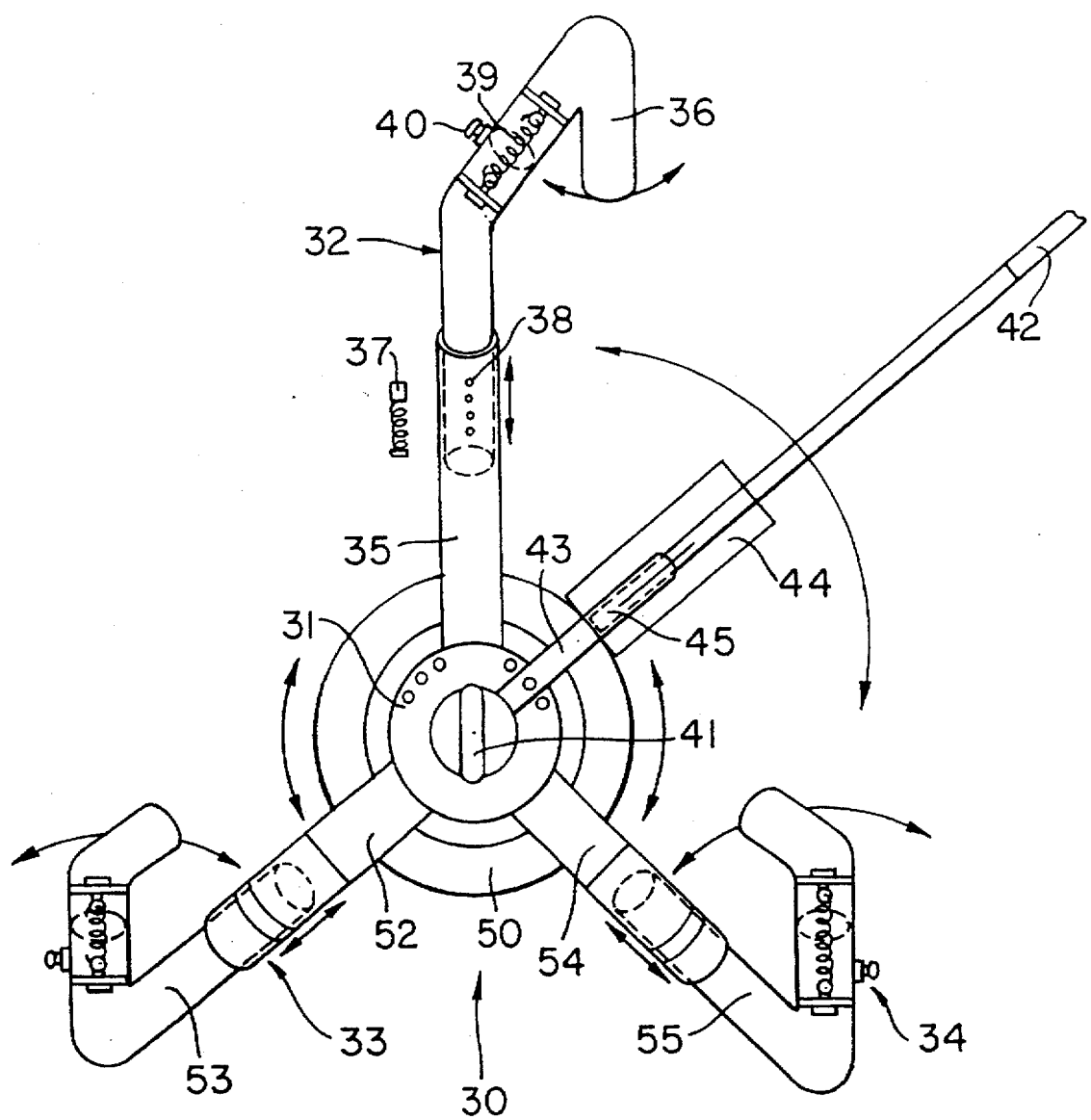
FIG. 3 shows a sample mechanism for attaching the present invention to the automobile wheels.

FIG. 1 shows an example frame as it would look after assembly and attachment to an automobile. The wheel attachment mechanisms 1, 2, 3, and 4 are shown as they would be attached to the wheels of the automobile. The upper frame 5 is attached to the wheel attachment mechanisms 1, 2, 3, and 4 by adjustable masts 6, 7, 8, and 9 to provide a skeleton for a flexible cover. The upper frame 5 shown in FIG. 1 is an example of a frame that can be used as part of the present invention. Other shape frames are also contemplated for use with the present invention.

As shown, the upper frame 5 is adjustable to fit different sized cars. Adjustable masts 6, 7, 8, and 9 are attached to the wheel attachment mechanisms 1, 2, 3, and 4 as shown, and connect the upper frame 5 to the wheel attachment mechanisms 1, 2, 3, and 4. Although four adjustable masts are shown, one for each wheel attachment mechanism, more may be used, depending on the size and shape of the upper frame. The masts are adjustable in length to accommodate any size vehicle.

The upper frame includes a number of longitudinal and transverse members. The example shown in FIG. I has four longitudinal members 10, 11, 12, and 13 and three transverse members 14, 15, and 16. It is contemplated that the present invention may have any number of longitudinal members, transverse members, and diagonal bracing members necessary to accommodate the size and shape of the particular vehicle being protected. In the example shown in FIG. 1, the two longitudinal members on either side are attached to each other using T-connecters 17 and 18, and are connected to the transverse members through these T-connecters and through four elbow T-connecters 19, 20, 21, and 22. The masts are also connected to the upper frame at the elbow T-connecters. Other types of connecters may be used to suit the particular size, shape, and design of the upper frame. For example, if two masts are used per wheel attachment mechanism, one may be attached to the upper frame using an elbow T-connecter, while the other is attached to the upper frame through a sliding sleeve on the longitudinal member.

As shown, any of the members used to construct the frame may be adjusted to fit the vehicle to which it is attached. In the example frame shown in FIG. 1, the masts can be adjusted to provide the necessary height, while the longitudinal members adjust to provide length and the transverse members adjust to provide the necessary width. In alternative embodiments, upper frame members may connect at angles to other members, or members may be hinged to adapt to a different shape.

The masts, longitudinal members, and transverse members are all poles that are adjustable in length. FIG. 2 shows a detail of an adjustable pole 23 suitable for use with the present invention. The adjustable pole 23 includes a rod 25 and an outer sleeve 24. The outer sleeve 24 slides along the length of the rod 25 to provide the desired length. Once the desired length is attained, the pole 23 is temporarily fixed at that length through the use of a locking mechanism. For example, a twist locking mechanism may be used whereby a pin in the rod 25 is engaged in a groove in the sleeve 24 by twisting the rod 25 and/or sleeve 24.

Figure 4:
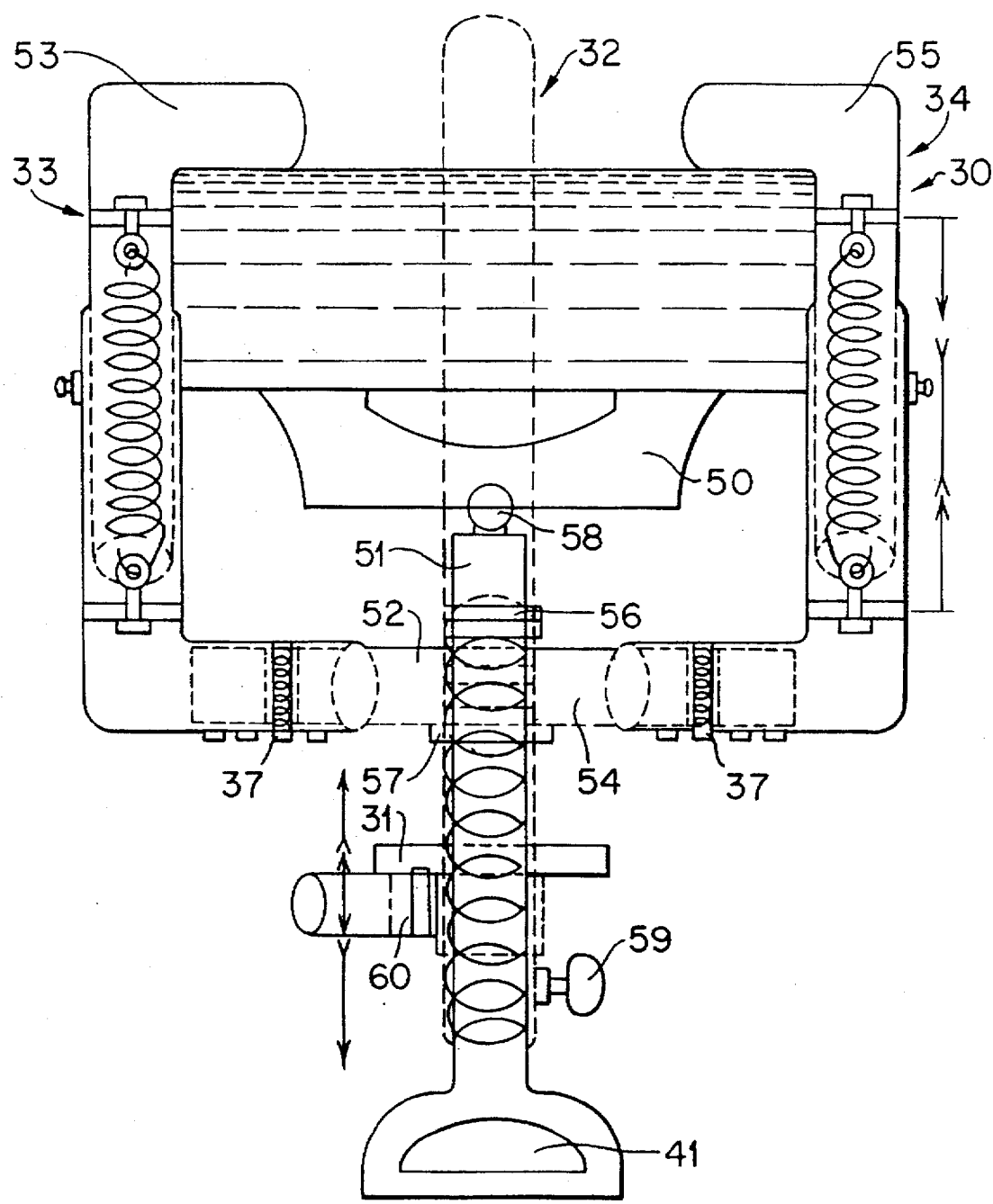
FIG. 4 shows a detail of the top view of an example wheel attachment mechanism.

FIG. 3 and FIG. 4 show different views of an example wheel attachment mechanism 30. The wheel attachment mechanism 30 clamps to the wheel to provide a stable base for the frame. Each wheel attachment mechanism 30 includes a brace 50, a shaft 51, and a number of clamp members, the example shown in FIGS. 3 and 4 having three such clamp members 32, 33, and 34. It is preferred that three clamp members be used in order to provide a secure grip on the wheel of the vehicle.

The structure of each clamp member includes two main pieces. The first piece is a radial arm in the form of a substantially straight piece of tubing that radiates from the axis of the shaft 51. The other piece is a swing arm that is formed such that it can attach around the circumferential periphery of the tire. For example, a U-shaped member can clamp around the outside of the tire. The proximal end of the swing arm attaches to the radial arm, while the distal end of the swing arm fits around the back side of the tire. The swing arm is free to rotate about the axis of the radial arm while putting the wheel attachment mechanism in place. The swing arm may slide inside the radial arm, as shown in FIG. 3, or the radial arm may slide inside the swing arm, as shown in FIG. 4.

One clamp member is preferably located such that it can be clamped over the top-most portion of the tire, that is, at the twelve o'clock position. For example, FIG. 3 shows a clamp member 32 at this position. The clamp member in the twelve o'clock position has a radial arm 35 that is in a fixed position with respect to the shaft 51. The brace 50 is placed against the center of the wheel hub and the top swing arm 36 is extended with respect to the radial arm 35 until it can be swung over and hooked onto the top of the tire. The swing arm 36 is then locked into place with respect to the radial arm 35. One way in which the swing arm 36 can be locked into place is through the use of a locking pin 37 that is pushed through coaxial holes 38 in the swing arm 36 and the radial arm 35. The locking pin 37 may be of the spring-release type. A series of holes may be provided so that the wheel attachment mechanism can be used with vehicles having different size wheels. The swing arm 36 may also be adjustable to fit tires having different widths, in order to provide a secure clamping grip on the wheel. This may be accomplished by forming the swing arm in two pieces connected in a reciprocating manner by a spring-loaded device 39. Once the swing arm 36 is adjusted to the appropriate width, the pieces can be locked in place with a pin, or locking key 40. Using a locking key will deter theft of the present invention while the owner is away.

The other two clamp members 33 and 34 have a construction similar to that of the first clamp member 32. One clamp member 33 includes radial arm 52 and swing arm 53, and the other clamp member 34 includes radial arm 54 and swing arm 55. These clamp members, however, are free to pivot about the shaft 51. Thus, after the first clamp member 32 is in place on the tire, the remaining clamp members can be positioned about the wheel for the best fit. An inner lock ring 56 and an outer lock ring 57 keep the pivoting clamp members locked into position.

The pivoting clamp members 33 and 34 pivot about the shaft 51, which extends from the center of the brace 50. The shaft 51 may be attached to the brace 50 by a pivot ball and snap ring assembly 58, or by some other connecter that provides a degree of flexibility. The outer end of the shaft is capped by a handle 41. The handle 41 covers the outside end of the shaft, while providing a convenient place for grasping the wheel attachment mechanism 30. The brace 50 is preferably large enough to cover any lug nuts that may be exposed, deterring theft by wheel removal. A locking key 60 can also be used to secure the handle to the shaft.

Also attached to the shaft is at least one radial mast arm, which is also free to pivot about the shaft. This mast arm is shown in FIG. 3 in one position 43 and in FIG. 4 in another position 60 to illustrate the free pivoting ability of the mast arm. Referring to FIG. 3, the mast 42 attaches to this mast arm 43, preferably by sliding into or around the mast arm 43, and is locked in place in some manner, preferably with a pin 45. Once the mast 42 is locked into place, the area around which the mast 42 and the mast arm 43 are connected may be enclosed by a protective cover, such as a foam bumper 44. This cover protects the finish of the vehicle from any contact that would occur between the mast 42 or mast arm 43 and the vehicle. A plate 31 is attached to the shaft 51. This plate 31 is keyed so that the mast arm 43 can be locked into place.

Figure 5:
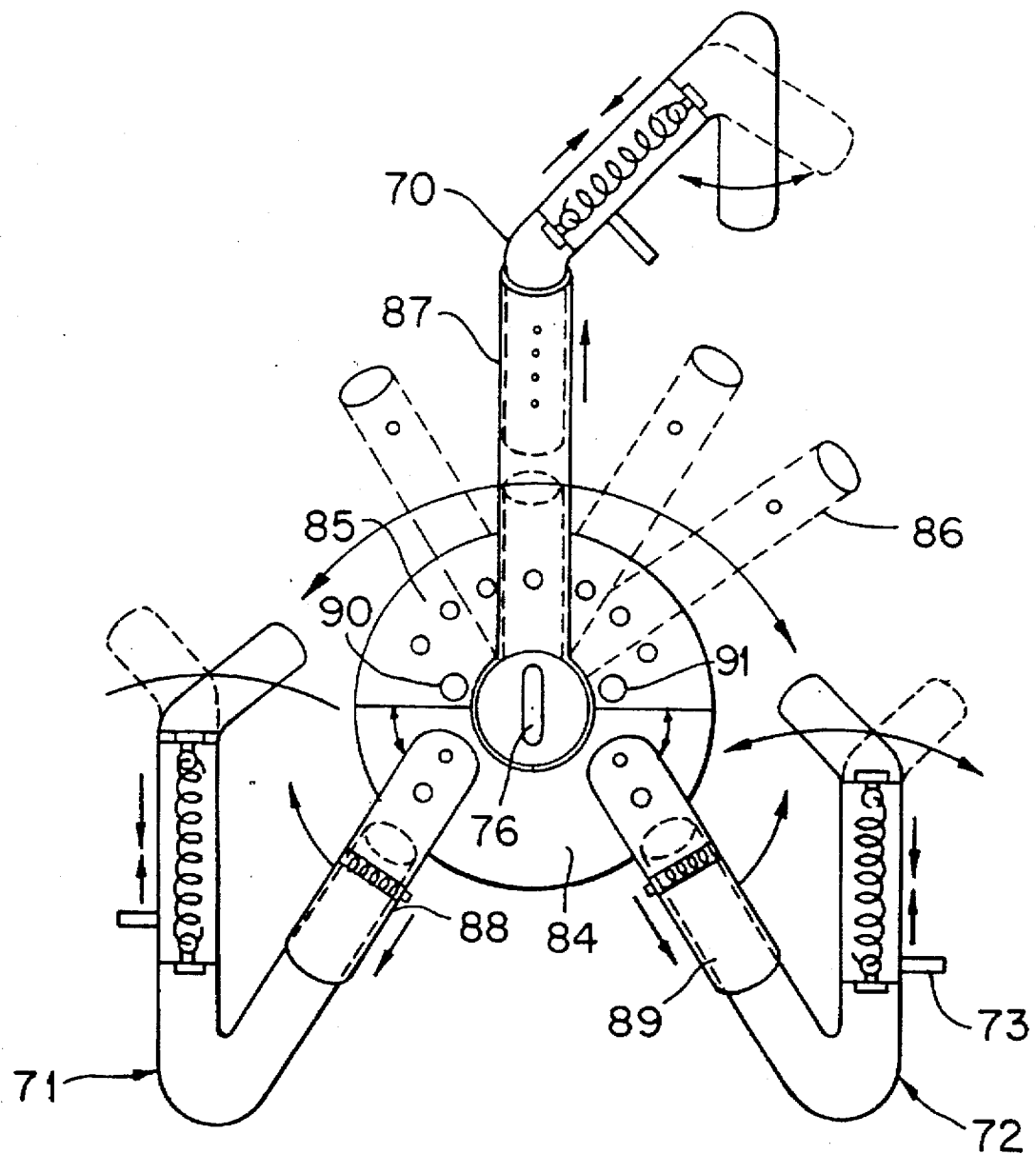
FIG. 5 shows the preferred mechanism for attaching the present invention to the automobile wheels.
Figure 6:
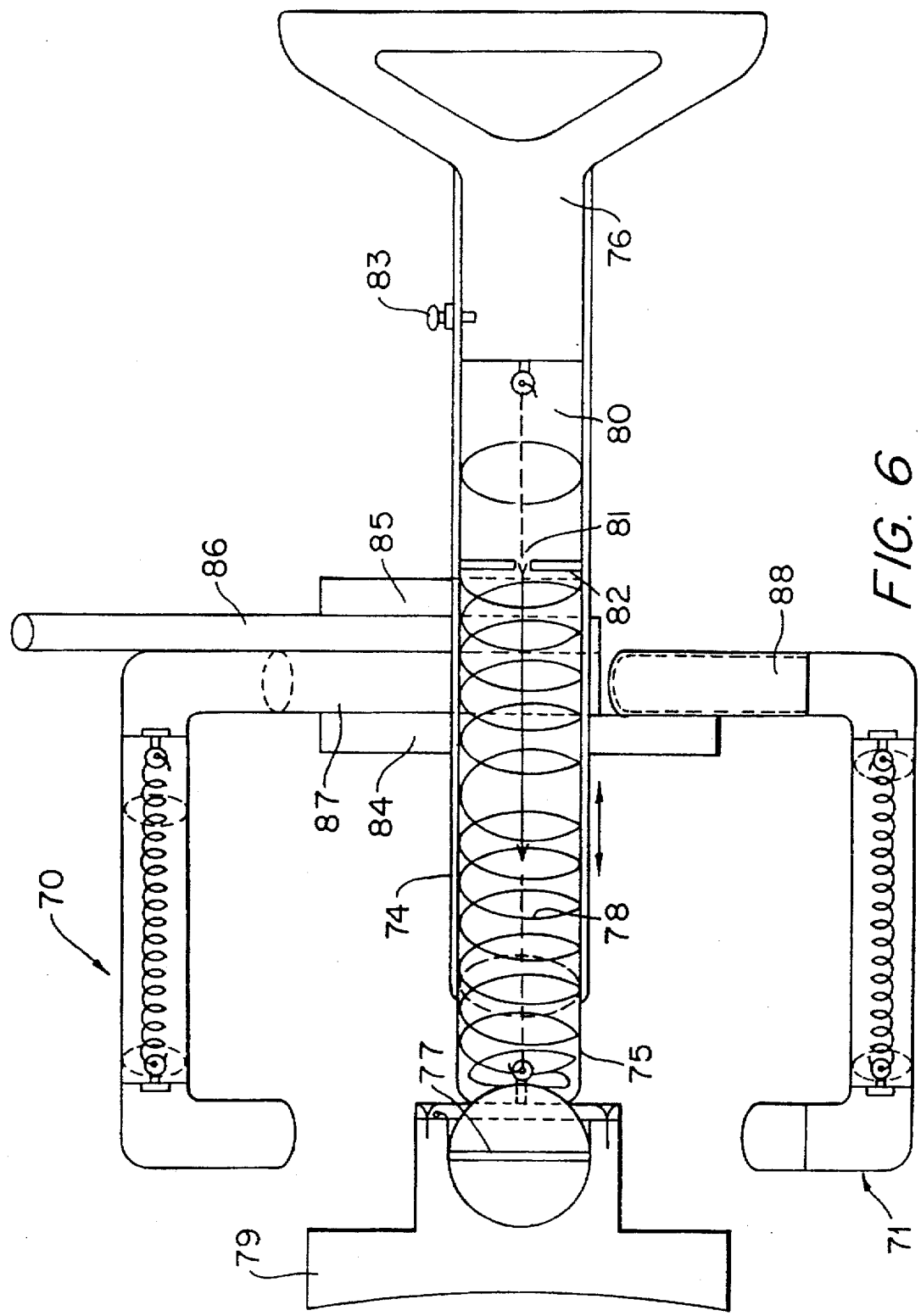
FIG. 6 shows a detail of the top view of the preferred wheel attachment mechanism.

FIG. 5 and FIG. 6 show different views of the preferred design for the wheel attachment mechanism. This embodiment allows the clamp members to be folded flat for easy portability. This design also provides for the mast to be adjustable over a 180 degree arc, allowing for great flexibility in shaping the completed vehicle cover. The range of adjustment of the mast also allows the vehicle cover to be kept level, even when the vehicle is parked on a grade. As shown in FIGS. 5 and 6, this embodiment includes three clamp members, one upper clamp member 70 and two lower clamp members 71 and 72. These clamp members are adjustable for tire diameter and width as in the previously described design. Push handles 73 may be attached to the clamp members to assist in adjusting the clamp member elements.

The core of the wheel attachment mechanism is a spring-loaded tube and handle assembly. This assembly includes an outer tube 74, an inner tube 75, and a handle 76 and is connected to the brace by a pivot ball and snap ring assembly 77. The inner tube 75 contains the spring 78 and slides inside the outer tube 74. The spring 78 is fixed to the brace 79 at the distal (wheel) end. The handle 76 includes a tube 80 at the distal end that is closed except for a small opening 81 through which the proximal (handle) end of the spring 78 passes. The proximal end of the spring 78 is attached to the handle 76 inside the handle tube end 80. The handle tube end 80 slides inside the inner tube 75, compressing the spring 78 and providing pressure that presses the brace 79 against the wheel. The closed end 82 of the handle tube 80 acts as a spring stop to compress the spring 78 as the handle 76 is pushed toward the wheel. When the wheel attachment mechanism is in place, the spring-loaded tube and handle assembly is kept in the compressed state through the use of a tube locking pin 83 or other locking mechanism. When the pin 83 is removed, compression is released and the wheel attachment mechanism can be removed.

An inner plate 84 and a key plate 85 are fixed to the outer tube 74, with the upper clamp member 70 and the radial mast arm 86 connected to the outer tube 74 between the inner plate 84 and the key plate 85. The inner plate 84 is preferably a circular shaped plate fixed to the outer tube 74 such that the outer tube 74 passes through the center of the inner plate 84 and the axis of the outer tube 74 is substantially perpendicular to the face of the inner plate 84. The key plate 85 is preferably a semi-circle that straddles the top of the outer tube 74. The radial arm 87 of the upper clamp member 70 is fixed to the proximal face of the inner plate 84 and/or to the outer tube 74, so that the radial arm 87 always points substantially in the twelve o'clock position.

The radial arms 88 and 89 of the lower clamp members are pivotally attached to the inner plate 84. This allows the angle of the lower clamp members 71 and 72 with respect to the upper clamp. member 70 to vary. Once the lower clamp members 71 and 72 are positioned to the desired angle, they are held in place through a locking mechanism, such as a removable pin through a hole in the inner plate. When the wheel attachment mechanism is removed from the wheel, the lower clamp members 71 and 72 can be folded up against the upper clamp member 70, making the wheel attachment mechanism relatively flat for easy storage.

The radial mast arm 86 is connected to the outer tube 74 such that it can rotate about the outer tube 74. Stops 90 and 91 may be provided on the key plate 85 to prevent the mast arm 86 from rotating beyond 90 degrees in either direction with respect to the upper clamp member 70, thus allowing a full 180 degrees of rotation. The key plate 85 is keyed to provide intermediate stops for the mast arm 86, so that the mast arm 86 can be held in place when the desired angle is attained. This keying may be provided by a series of holes in the key plate aligning with a hole in the mast arm 86, which can be held in place by a removable pin. If more than one mast arm is used, a series of mast arms and key plates may be connected to the outer tube 74.

The material used to construct the elements of the frame is preferably a lightweight, strong metal or a heavy, sturdy plastic. Many of the frame members can be tubular to make them lighter. The material used to construct the wheel attachment mechanism is preferably a durable metal that can withstand repeated applications.

Figure 7:
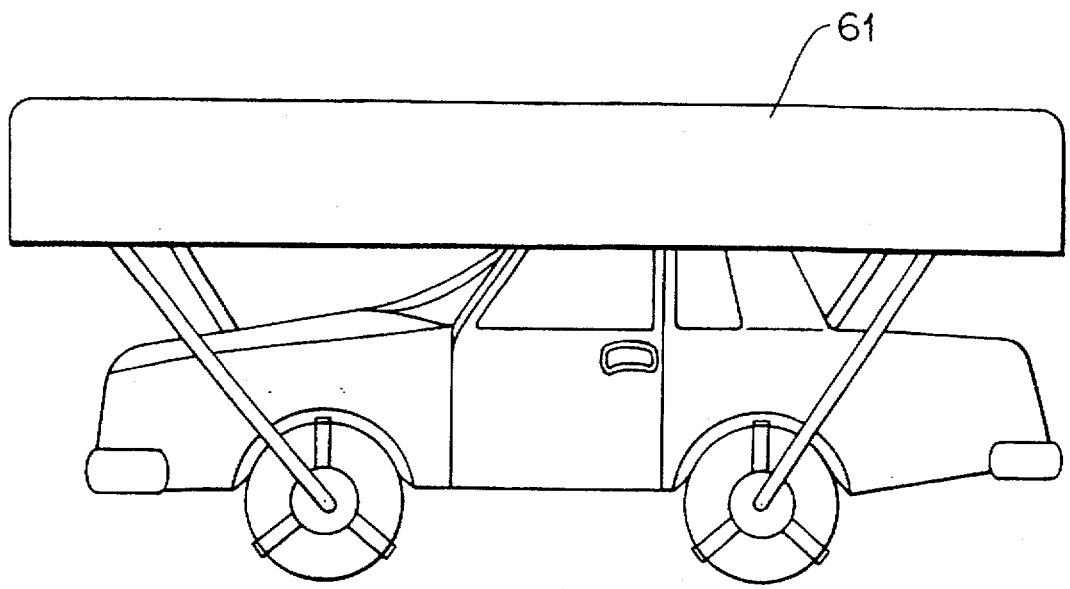
FIG. 7 shows the present invention fully assembled and attached to an automobile.

Once the frame is assembled and attached to the vehicle, a flexible fabric cover 61 can be attached to the frame, as shown in FIG. 7. The material composing the cover 61 should be strong and flexible to withstand the wear and tear that accompanies repeated uses. The cover 61 can be attached to the frame in any known manner, such as through the use of fabric strips that snap to the main cover 61.

Figure 8:
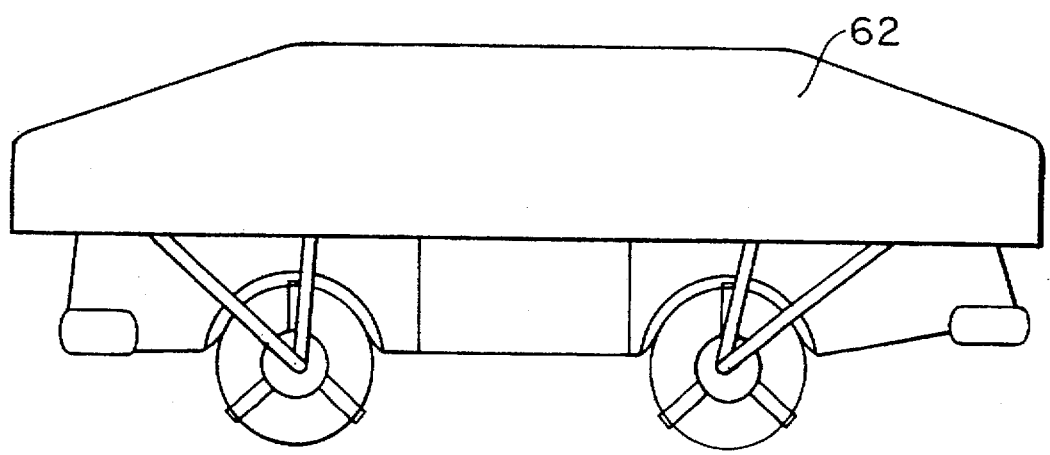
FIG. 8 shows an alternative fully assembled vehicle cover.

The cover and frame shown in FIG. 7 pertain to an embodiment of the present invention having one mast per wheel attachment mechanism. FIG. 8 shows an embodiment having two masts per wheel attachment mechanism. As shown, the extra masts provide an angle to the cover 62 so that the cover 62 conforms more closely to the shape of the car, although the cover 62 does not touch the body of the car at any time.

In addition to changing the shape through the number of masts and frame members used, the size and height of the present invention can be changed merely by adjusting the lengths of the masts, longitudinal members, and transverse members and the size of the fabric cover. For example, referring to FIG. 7, the portable carport can be brought closer to the top of the car by shortening the masts. The frame can also be lengthened to better cover the front and back of the car by lengthening the longitudinal members. The car can also be better protected by using more material for the cover 61, so that more of the material drapes over the frame and envelops the car. If desired, the material can be placed only over the top of the frame to provide a flat cover.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the present invention, be apparent to persons of ordinary skill in the art.

What is claimed is:

1. An attachment mechanism, comprising:
    a) a shaft;
    b) an inner plate fixed to the shaft;
    c) a first clamp member fixed to the inner plate; and
    d) a plurality of additional clamp members pivotally connected to the inner plate;
    e) the first clamp member and the plurality of additional clamp members being adjustable to fit around and grasp an object when an end of the shaft is placed against the object.

2. The attachment mechanism of claim 1, wherein the shaft comprises:
    a) an outer tube attached to the inner plate;
    b) an inner tube slidingly connected within the outer tube, the inner tube having a distal end and a proximal end;
    c) a spring having a distal end and a proximal end and located within the inner tube;
    d) a brace connected to the distal end of the spring and pressed against the object; and
    e) a handle assembly attached to the proximal end of the spring, the handle assembly comprising a handle attached to a handle tube, the handle tube slidingly connected within the inner tube from the proximal end of the inner tube, the handle tube comprising a spring stop adapted to press against and compress the spring when the handle is pushed in the direction of the distal end of the inner tube.

3. The attachment mechanism of claim 2, wherein the shaft further comprises a locking mechanism adapted to hold the shaft in a compressed state.

4. The attachment mechanism of claim 3, wherein the locking mechanism is a lock pin.

5. The attachment mechanism of claim 1, further comprising:
    a) a key plate fixed to the shaft; and
    b) a radial arm pivotally connected to the shaft;
    c) the key plate comprising end stops to prevent the radial arm from pivoting more than 180 degrees about the shaft.

6. The attachment mechanism of claim 5, wherein the key plate is keyed to provide intermediate stops that restrict the pivotal movement of the radial arm.

7. The attachment mechanism of claim 1, wherein the first clamp member and each of the additional clamp members comprises a radial clamp arm slidingly connected to a swing arm so as to allow reciprocating movement and pivotal movement between the radial clamp arm and the swing arm.

8. The attachment mechanism of claim 7, wherein the first clamp member and each of the additional clamp members further comprises a spring connected to the radial clamp arm and the swing arm and adapted to restrict reciprocating movement between the radial clamp arm and the swing arm.

9. The attachment mechanism of claim 7, wherein the swing arm comprises a first piece and a second piece slidingly connected so as to allow pivotal movement between the first piece and the second piece and further to allow reciprocating motion between the first piece and the second piece in a direction substantially perpendicular to the reciprocating motion between the radial clamp arm and the swing arm.

10. The attachment mechanism of claim 9, wherein the first clamp member and each of the additional clamp members further comprises a spring connected to the first piece and the second piece and adapted to restrict reciprocating movement between the first piece and the second piece.

* * * * *